United States Patent
Seymour et al.

(10) Patent No.: US 10,341,279 B2
(45) Date of Patent: Jul. 2, 2019

(54) ACTION LINKS

(71) Applicant: salesforce.com, inc., San Francisco, CA (US)

(72) Inventors: Christopher Douglas Seymour, San Francisco, CA (US); Kamyar Seradjfar, Castro Valley, CA (US); Thomas Archie Cook, Jr., Boulder, CO (US); Jody Elizabeth Bleyle, Portland, OR (US); Mohamad Arabo, Kirkland, WA (US); John Christopher Houston, Superior, CO (US)

(73) Assignee: salesforce.com, inc., San Francisco, CA (US)

( * ) Notice: Subject to any disclaimer, the term of this patent is extended or adjusted under 35 U.S.C. 154(b) by 317 days.

(21) Appl. No.: 14/871,911

(22) Filed: Sep. 30, 2015

(65) Prior Publication Data

US 2016/0105383 A1    Apr. 14, 2016

Related U.S. Application Data

(60) Provisional application No. 62/061,783, filed on Oct. 9, 2014.

(51) Int. Cl.
   *G06Q 50/00*    (2012.01)
   *H04L 12/58*    (2006.01)
   *H04L 29/08*    (2006.01)

(52) U.S. Cl.
   CPC .............. *H04L 51/18* (2013.01); *H04L 67/02* (2013.01); *H04L 67/20* (2013.01); *G06Q 50/01* (2013.01); *H04L 51/32* (2013.01); *H04L 67/306* (2013.01)

(58) Field of Classification Search
   CPC ......... H04L 51/18; H04L 67/02; H04L 67/20; G06Q 50/01; G06F 17/3089
   USPC ........................................ 709/203, 205, 206
   See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |

(Continued)

OTHER PUBLICATIONS

Nicholas Fandos, Senate Passes Bipartisan Criminal Justice Bill, Dec. 18, 2018, www.nytimes.com, https://www.nytimes.com/2018/12/18/us/politics/senate-criminal-justice-bill.html (Year: 2018).*

(Continued)

*Primary Examiner* — David R Lazaro
*Assistant Examiner* — Zi Ye
(74) *Attorney, Agent, or Firm* — Sterne, Kessler, Goldstein & Fox P.L.L.C.

(57) ABSTRACT

The technology disclosed includes a method for initiating a web service through an action item within a post in a social media network. A request is received from a user for a post to a social network. The request includes a definition for an action-link-group, which comprises one or more action links. The post is created to include the action-link-group and is then uploaded to the network. Upon receiving a selection of an action link within the action-link-group, an action item associated with the action link is performed.

21 Claims, 6 Drawing Sheets

(56) References Cited

U.S. PATENT DOCUMENTS

| | | |
|---|---|---|
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 9,325,696 B1* | 4/2016 | Balfanz ............... H04L 63/0815 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2006/0095538 A1* | 5/2006 | Rehman ................ H04L 67/14 709/217 |
| 2006/0248442 A1* | 11/2006 | Rosenstein ............ G06F 17/24 715/205 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0106374 A1* | 4/2009 | Easwar ............... G06Q 10/107 709/206 |
| 2009/0172560 A1* | 7/2009 | Cole ................ G06F 17/30905 715/744 |
| 2009/0177744 A1 | 7/2009 | Marlow et al. |
| 2009/0235349 A1* | 9/2009 | Lai .................... H04L 9/3213 726/14 |

(56) References Cited

U.S. PATENT DOCUMENTS

| | | |
|---|---|---|
| 2010/0318571 A1* | 12/2010 | Pearlman ............. H04L 63/104 707/784 |
| 2011/0078232 A1* | 3/2011 | Van Den Driessche .................... G06F 17/3089 709/203 |
| 2011/0185361 A1* | 7/2011 | Ng ............................ G06F 8/71 718/102 |
| 2011/0218958 A1 | 9/2011 | Warshavsky et al. |
| 2011/0219338 A1* | 9/2011 | Schneider ............... G06F 3/048 715/835 |
| 2011/0247051 A1 | 10/2011 | Bulumulla et al. |
| 2012/0042218 A1 | 2/2012 | Cinarkaya et al. |
| 2012/0102402 A1* | 4/2012 | Kwong .................. G06F 3/038 715/705 |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0247216 A1 | 9/2013 | Cinarkaya et al. |

OTHER PUBLICATIONS

Salesforce.com, "Salesforce Spring '15 Release Notes," @salesforcedocs, May 20, 2015, pp. 1-20, 120-121, 203-205, 258-262, 282-296, 303-306, 314-325, 330-333, (69 pages).

Salesforce.com, "Salesforce Winter '15 Resease Notes," ©salesforcedocs, Dec. 22, 2014, pp. 1, 11, 23, 191-196, 300-316, (30 pages).

Salesforce.com, "Salesforce.com Summer '14 Release Notes," @salesforcedocs, May 22, 2014, pp. i-iii, 1-6, 36-37, 62-65, 79-81, 282-297, (36 pages).

"Cross-Origin Resource Sharing," ed. Anne van Kesteren, W3C Recommendation Jan. 16, 2014, <http://www.w3.org/TR/cors/> Retreived Jun. 20, 2015, 22 pages.

Salesforce.com, "Salesforce Summer '15 Release Notes," @salesforcedocs, Jun. 15, 2015, pp. 1-2, 240-246, 253-256, 264-267, 277-279, (22 pages).

* cited by examiner

ACTION LINKS

RELATED APPLICATION

This application claims benefit of U.S. Provisional Patent Application 62/061,783 entitled "ACTION LINKS," by Christopher Douglas Seymour et al., filed Oct. 9, 2014, the entire contents of which are incorporated herein by reference.

TECHNICAL FIELD

This disclosure relates generally to database management for mobile applications, and more particularly, to systems and methods for initiating action items from a post or record on a social network.

BACKGROUND

The growing popularity of cloud computing and software as a service ("SaaS") has led to the development of software platforms for businesses and other enterprises that provide more advanced cloud-based products and services, in addition to simple data storage and management requirements. Salesforce.com Inc., of San Francisco, Calif., offers a number of customer relationship management ("CRM") products and services that are cloud-based solutions upon which relevant applications can be launched and/or built for any business or enterprise, and can be integrated with the data storage and management services of a multi-tenant database system.

For example, the Salesforce1 platform is widely used for the development and deployment of mobile applications in an enterprise network. The Salesforce1 platform is built on a core integrated development environment ("IDE") called Force.com, which is a set of tools and services for creating and launching employee-facing applications that are both mobile and social. The Force.com platform includes a number of standard applications, which may be extended by customization, or custom applications may be created. The Force.com platform also includes access to a store for applications called the AppExchange, which is similar to the iTunes App Store, but for business applications.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that can be made by one skilled in the art without departing from the spirit and scope of this disclosure. A more complete understanding of the subject matter can be derived by referring to the detailed description and claims when considered in conjunction with the following figures, wherein like reference numbers refer to similar elements throughout the figures.

FIG. 4 illustrates an action-link-group template.

FIG. 5 illustrates an action link template.

DETAILED DESCRIPTION

Figure 1:
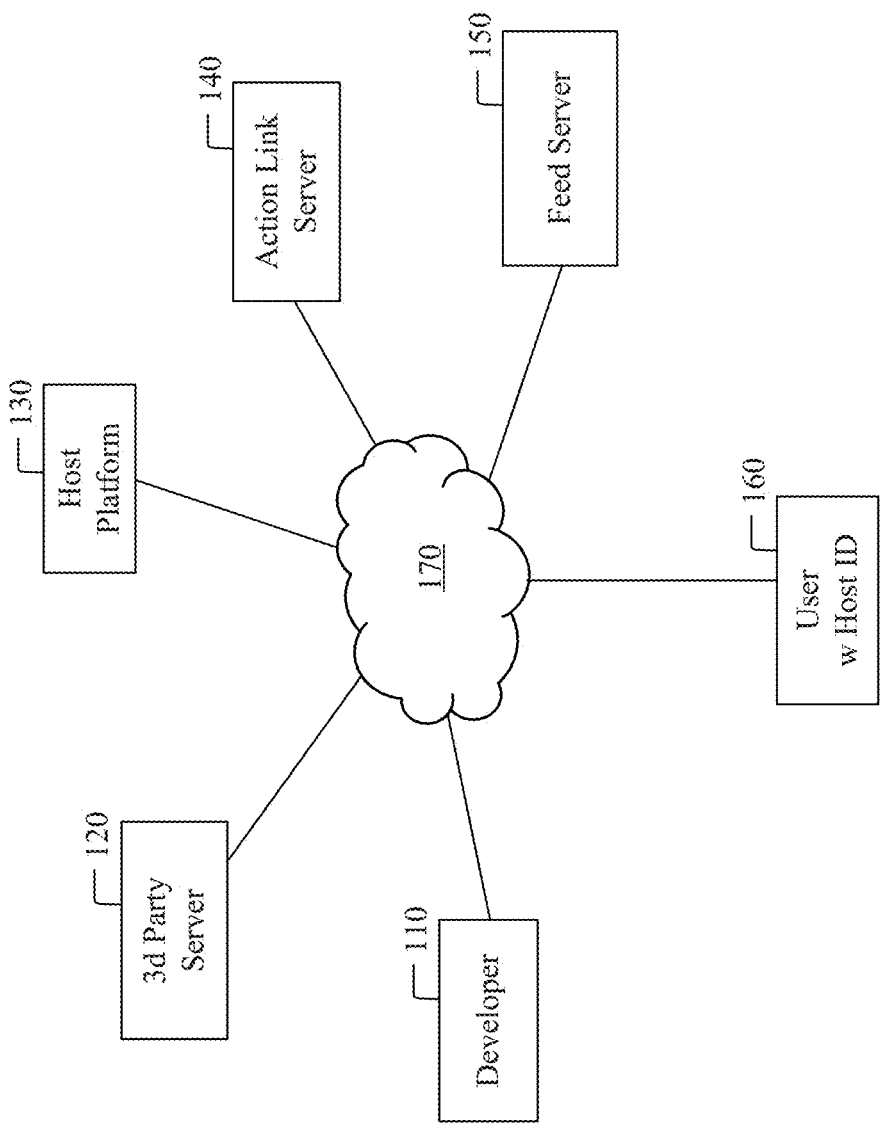
FIG. 1 illustrates an example of an environment that supports action links.

The following detailed description is made with reference to the technology disclosed. Implementations are described to illustrate the technology disclosed, not to limit its scope, which is defined by the claims. Those of ordinary skill in the art will recognize a variety of equivalent variations on the description.

Introduction

The technology disclosed brings invocation of third party business work-flows, which can require authorization, directly into a social feed tool. Social network feeds are increasingly used in business to deliver messages to a team. The technology disclosed brings action links with credentials and groups of action links to the social feed to give a feed recipient immediate access to a plurality of processing systems.

Social networks have been repurposed by organizations to distribute incoming messages to groups of interested users. The technology disclosed improves the users' ease of acting on the incoming messages by providing action links and action-link-groups that can be used to select among and launch third party systems and business work-flows as simply as clicking on an embedded control. The technology handles authentication on an action-by-action, link-by-link basis, to third party systems and business work-flows without exposing the authentication credentials used to invoking the systems. The action links and action-link-groups are easy to author and deploy because they can be descriptively specified, using JSON, for instance. They are secure because the authentication credentials are kept server side. The authentication credentials or tokens can be as granular as desired, even to pairs of actions and users. Credentials for action links can be securely updated on the server side without ever being exposed to users.

The action links and action-link-groups work together to offer easy deployment. An action link can encapsulate an API and authentication token with a link name. An action-link-group consists of one or more action links, which the action-link-group distributes across the user interface.

A feature of the Salesforce CRM software is real-time information feeds in a social network. For example, feeds in a Salesforce community show posts and comments, as well as record updates. A user can choose to follow people and records to see updates in their feeds. However, it would also be desirable to provide a means for users to initiate actions, called action links, as a result of the information provided in a feed. In addition to feeds and records, this functionality can be extended to other systems such as mobile notifications, related lists, email, and any other Salesforce system based on metadata. And, the functionality can include API calls to RESTful (REpresentational State Transfer) web services, or any other HTTP based API such as SOAP (Simple Object Access Protocol), for interaction with Salesforce as well as third party applications. A third party application is any feed system or non-feed system that is incorporated by a host application. This includes HTML, or an API that requests access for incorporation in a host application. A host application is a feed or non-feed application that receives a request from a third party application to incorporate data from the third party application.

Action links are created as part of an action-link-group. Action-link-groups are created by a developer in a development environment, and stored in a production environment. An administrator can then configure and deploy the action-link-group in production to one or more users. In one example, and action-link-group can contain two action links.

The first action link can be for a manager to approve travel for a subordinate, and the second action link can be for the manager to reject the travel request.

In another example, an action-link-group is created with a first action link to submit an expense report, and a second action link to approve the expense report. The action-link-group can be assigned to all members of a group named "staff." A user in the group "staff" can select the action link to submit an expense report, but not approve it. The action link for submission of the expense report can then perform a Post to a RESTful service, including information about the staff member submitting the expense report, and a copy of the expense report. The RESTful service can then execute a business work-flow that discovers the manager of the staff member, then forwards the action-link-group to the manager. Users in the "manager" group have permission to "approve" the expense report. This approval executes a Post to a RESTful service that triggers a business work-flow to approve the expense report, and then submit it to accounting for payment.

Action Links

In one embodiment, an action link is defined as a uniform resource locator ("URL") on a feed item that links to an application programming interface ("API"), a web page, or a file. An action link can also include an HTTP method and OAuth information. Action links can be used to bring any Salesforce or third party functionality to a Salesforce community, and can target specific users. Thus, the action links can provide an API framework that makes it easy to integrate functionality within the feed.

Action links can be configured in a number of different ways; for example, to appear as buttons in a post, or as links in an overflow menu of the post. The use of action links enables users to perform actual work in the feed, and is a powerful way to ensure that users adopt and engage effectively and productively in a Salesforce community via the Salesforce1 platform or a standard user interface. In one example, an action link is always a member of an action-link-group, and an action-link-group is associated with a feed.

Action-Link-Groups

An action-link-group can be associated with feed items, private messages, notifications, records, email, etc. In order to indicate the priority and relative location of an action-link-group in a feed, a "category" parameter is defined in the metadata for the action-link-group that defines the look and layout of the action-link-group in the user interface ("UI"). Examples of values for the category parameter are "primary," where the action-link-group is displayed in the feed item on the UI, and "overflow", also known as "unclassified," where the action-link-group is displayed in the overflow menu at the top right corner of the feed item.

FIG. 1 illustrates an example of an environment that supports action links. In this example, a user 160, after authenticating on the host platform 130, is participating in feeds from the feed server 150. In this environment, a developer 110 can create an action-link-group containing one or more action links, and store it on an action link server 140. These action-link-groups can be associated with a feed item and the user 160 by the developer 110 to perform actions on a host platform 130 as well as on a $3^{rd}$ party server 120.

Figure 2:
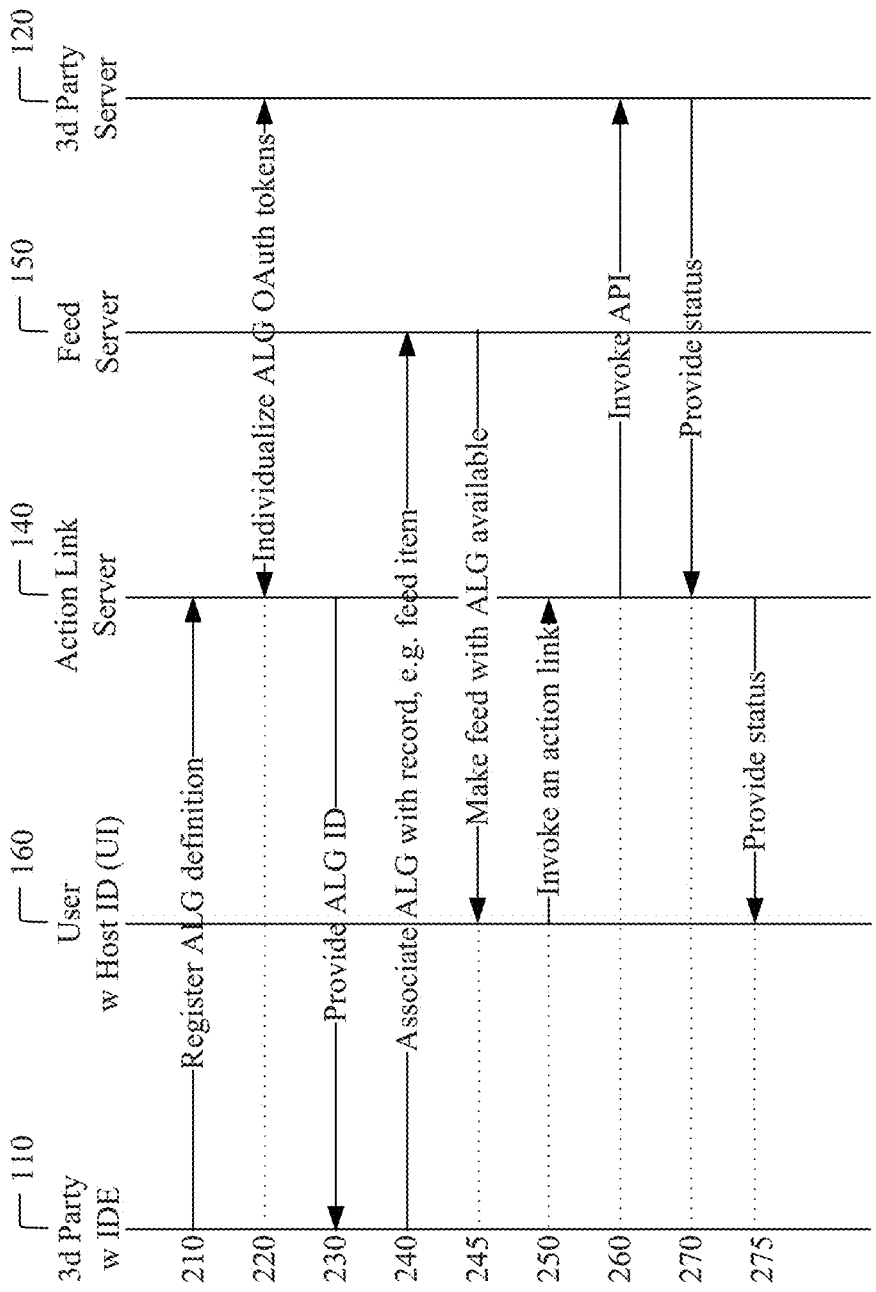
FIG. 2 illustrates an example of a message flow diagram.

FIG. 2 illustrates an example of a message flow diagram. In this example, a $3^{rd}$ party developer 110 creates an action-link-group definition, containing one or more action links, and registers 210 the action-link-group with the action link server 140. Table I is an illustration of an action-link-group definition:

TABLE I

Creating a definition for an action-link-group

```
{
"actionLinks": [
{
"actionType": "API",
"labelKey": "Post",
"groupDefault": "true",
"actionUrl": "https://test.com/this",
"method": "HttpPost",
"requiresConfirmation": "True"
"requestBody" : (\"body\" : \"api request body\"}]}}",
"headers":[
{"name":"Content-Type", "value":"application/json"
}]},],
"executionsAllowed": "OncePerUser",
"expirationDate": "2016-07-07T23:59:11.168Z",
"category": "Primary"
}
```

In this example JSON file, a number of metadata elements are defined within the action-link-group. In another example, an XML or other data format can be used. The key-value pairs shown include keys such as "executionsAllowed", which in this case has a value of "OncePerUser". Another possible value for this key could be "Unlimited", which would indicate that the action links can be executed an unlimited number of times by each user. Yet another possible value for this key could be "Once", which would indicate that only one user in the receiving group can execute the action link. Actions taken by users are stored so that "executionsAllowed" is not exceeded. This system also provides reporting on who triggered the action link, their selection, and when the selection was made. The key "expirationDate", which has a value of "2016-07-07T23:59:11.168Z", is used to indicate a date and time when this action-link-group becomes un-actionable. In one example, this date can be within one year of the current date and time of creating the action-link-group.

Figure 3:
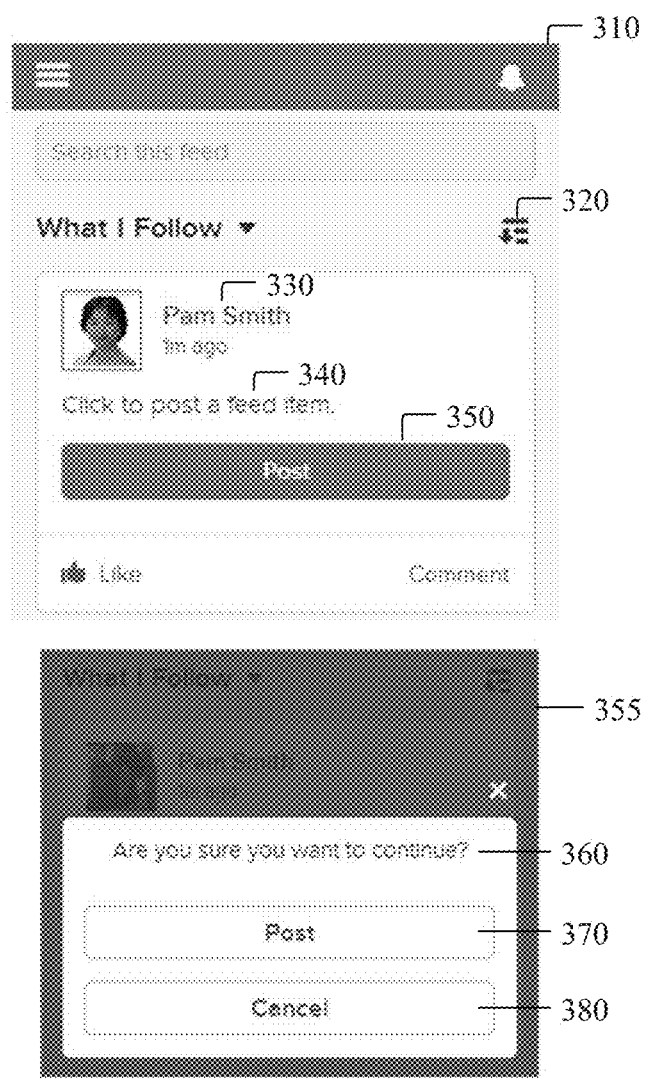
FIG. 3 illustrates an example of an action-link-group presented in a user's feed, with a confirmation dialog to confirm that they want to execute the action link.

Another key-value pair in Table I is "category":"Primary". In this example, a "category" can be "Primary", or "Overflow". Since the category in this example is defined as "Primary," the "Post" button 350 is displayed in the main feed 310, as shown in FIG. 3. However, if the category was defined as "overflow," then the "Post" button will not appear in the main feed, and the user will need to drill down into the feed item menu. In that case, the action-link-group can appear in the overflow menu 320.

The key "actionLinks" in Table I contains the action links. In this example, one action link with a "labelKey" of "Post" is described. This action link performs an HTML "method" of "HttpPost" to the "actionUrl" of a web service, which, in this case is exemplified in "https://test.com/this".

In one implementation, up to three action links may be created in a primary action-link-group and up to four action links may be created in an overflow action-link-group. To create a definition for an action-link-group, a developer 110 uses a connected application to post a request to the collection resource for the action-link-group 140, e.g., POST/connect/action-link-group-definitions.

In one embodiment, when action-link-groups are associated with one or more feed items, the action-link-groups show up as buttons. However, an action-link-group could also be associated with a notification, and in that case, the action-link-group will appear as a link instead of a button. When action links appear as a link, such as in the case of notifications, the user can sweep right or sweep left to invoke the action link.

In this example, the action link in Table I contains an action type of "actionType":"API". In one implementation, an Application Program Interface (API) comprises a library of routines, data structures, classes, and variables, as well as specifications of remote calls exposed to API consumers such as Simple Object Access Protocol (SOAP) and REST. For brevity, the term API in this context refers to a synchronous API. When necessary for granularity, synchronous APIs are referred to herein as sync-APIs, and asynchronous APIs are referred to herein as async-APIs. In one example, an API for a RESTful web service can result in subsequent calls to other APIs. Values possible for the action type "actionType" include "API", "ApiAsync", "Ui", and "Download", which is referred to collectively herein as API-URL.

Another feature of an action-link-group is the use of a "groupDefault" parameter. If the group default parameter is set to true in the action link definition, then the action link is displayed first within an action-link-group where the category is set to primary. There can be only one default action link per action-link-group.

The action link in Table 1 also has the key "requiresConfirmation" with a value of "true". The effects of this key-value pair are illustrated in FIG. 3. After clicking on the Post button 350, the user is asked if they want to continue 360, and a button with the "labelKey" value of "Post" 370 is displayed, as well as a "Cancel" button 380. If the "requiresConfirmation" key is "false", then the confirmation dialog 355 does not appear.

In this example, the "requestBody" key in Table I is used to submit request specific information to the 3rd party system defined in the "actionUrl" property. The content and shape of the request body is specific to the API/3rd party system specifications.

If individualized link OAuth tokens are required between the registered link group definition 210 and the 3$^{rd}$ party servers 120, then the developer 110 negotiates for those tokens, and can store them with the "headers" property of the action-link-group 220 on the action link server 140.

In another implementation, another way to register and create Action Link Groups is if a Connect Application or a developer via a tool such as cURL (command line URL), issues an API request 210 against the Action Link Group Definition Resource to create an Action Link Group. An example of this type of trigger can include the following:
curl -H "X-PrettyPrint: 1" -H "Content-Type: application/json"
-d '{"executionsAllowed":"OncePerUser", "expirationDate":"2015-09-20T19:32:10+0000", "category":"Primary",
"actionLinks":[{"actionType":"Api", "actionUrl":"/services/data/v34.0/chatter/feed-elements", "groupDefault":"true", "labelKey":"Post", "method":"HttpPost", "requiresConfirmation":"true", "requestBody":"{\"subjectId\": \"me\",\"feedElementType\": \"FeedItem\",\"body\":
{\"messageSegments\": [{\"type\": \"Text\",\"text\": \"This is a test post created via an API action link.\"}]}}",
"headers":[{"name":"Content-Type", "value":"application/json"}, {"name":"Authorization", "value":"OAuth 00DD00000007WNP!ARsAQHhIdgwbihG7e8ga"}]}]}'
-X POST "https://instance_name/services/data/v34.0/connect/action-link-group-definitions"
-H 'Authorization: OAuth 00DRR0000000N0g!RWaPj94O6yOD.1fjB9LqMk' --insecure Once the action-link-group has been registered 210 with the action link server 140, the action link server responds with an acknowledgement providing an action-link-group ID 230 illustrated in Table II.

TABLE II

Action-link-group Definition Response Body

{
"id": "0AgD00000000043KAA ",
"executionsAllowed": "OncePerUser",
"category": "Primary",
"expirationDate": "2015-12-12T19:32:10.000Z",
"createdDate": "2015-09-19T23:48:46.809Z",
"url": "/services/data/v32.0/connect/action-link-group-definitions/0AgD00000000043KAA ",
"modifiedDate": "2015-09-19T23:48:46.809Z",
"actionLinks": [{
"groupDefault": true,
"headers": [
{
"name": "Content-Type",
"value": "application/json"
},
{
"name": "Authorization",
"value": "OAuth 00DD00000007WNP!ARsAQHhIdgwbihG7e8ga"
}
],
"requestBody": null,
"labelKey": "OK",
"type": "Api",
"modifiedDate": "2015-09-19T23:48:46.838Z",
"id": "0AnD0000000003kBWJ ",
"excludedUserId": null,
"userId": null,
"method": "HttpGet",
"createdDate": "2015-09-19T23:48:46.838Z",
"requiresConfirmation": false,
"actionUrl": "/services/data/v31.0/chatter/users/me"
}]
}

The first "id" key is the ALG ID, and is an 18 character string of "0AgD00000000043KAA", wherein the third character "g" denotes a group. The ALG ID is used to retrieve the ALG, associate it with a feed item, delete it, etc. An ALG is only accessible to the 3rd party or connected app that created it. For example, an ALG created by developer1 cannot be accessed by developer2.

The id: "0AnD0000000003kBWJ" can be used to access the ActionLink via a Restful API call and, when invoked, executes the service at the "url" "/services/data/v31.0/connect/action-links/0AnD0000000003kBWJ". The third character in the action link "id" is "n", which indicates that the 18 character ID string is for an action link.

The ALG Definition response body outlined in Table II confirms the successful creation (registration) of the ALG based on the information provided in the Action-link-group Definition (ALGD) outlined in Table I.

The action-link-groups can also be associated with Notifications, Salesforce Records, etc. The same action-link-group can be associated with multiple items, and still preserve its stateful-ness across those items. To associate one or more action-link-groups with a feed item and post the feed item, the developer 110 makes a POST request to a services provider such as /services/data/v31.0/chatter/feed-elements and specifies the desired ALG id in the associated actions feed capability of the Feed Item request body, as illustrated in Table III. The action-link-group IDs are extracted from the "id" property of the /connect/action-link-group-definitions response 230, and are specified in the "actionLink GroupIds" request body as illustrated in Table III below:

TABLE III

Associate action-link-group with feed
item using feed item response body ID

```
{
"body": {
"messageSegments": [
{
"type": "Text",
"text": "Click to post a feed item."
}
]
},
"subjectId": "me",
"feedElementType": "feedItem",
"capabilities": {
"associatedActions": {
"actionLinkGroupIds": ["0AgD00000000043KAA",
"0AgD00000000043SNB"]
}
}
}
```

One or more values can be entered for the key "actionLinkGroupIds". Only the ALG defined as "Primary" will show up in the main feed body. All other ALGs will show up in the "Overflow" 320 area. The action-link-group is then associated 240 with a feed server 150.

When a developer associates an action-link-group with a feed item, a user with host ID 160 can render a main feed 310 on the client device as illustrated in FIG. 3. The value ("Click to post a feed item.") associated with the key "text" in Table III appears in the main feed 310 as 340. The same action-link-group can be associated with multiple feed items, notifications, or records. However, the execution status of the action link is maintained and reflected in all relevant entities, e.g., feed item, message, notification, record, etc. in order to address the "executionsAllowed" key of Table I. For each "actionLinkGroupIds" value in Table III, the action links within the ALG are presented to the client. In one example, if a user 330 clicks on the Post 350 button, and were then to click on the Post 370 button, the technology disclosed would execute the action link "id" of "0AnD0000000003kBWJ" shown in Table II.

To update the Status of an Action Link or Invoke an Action Link, use the "/connect/action-links/actionLinkId" resource and update the status property of an action link. To invoke an Api or an ApiAsync action link, set the status to PendingStatus. The status of the action link in combination with the labelKey property of the Action Link Definition Input determines the text that displays in the UI." The first status value 275 can be generated by the action link server 140, which designates the status of a RESTful service call 250 made to the action link server 140 by the UI of the user 160 or by some other calling application such as cURL. The second status value can be "patched" by the UI 160, which designates the status of the API call from the perspective of the UI.

A developer can us a Patch request to update the status of an action link or invoke an action link. Different types of action links have different status workflows.

To invoke an API action link from an application, a developer can make a PATCH request to mark the link "PendingStatus". The technology disclosed handles the call out to the "actionUrl" that was provided in the Action Link Definition Input. For an API action link, the technology disclosed sets the status to "SuccessfulStatus" or "FailedStatus" based on the HTTP status code returned by the server.

To invoke an "ApiAsync" action from an app, make a PATCH request to mark the link "PendingStatus". The technology disclosed handles the call out to the actionUrl that was provided in the Action Link Definition Input. For an "ApiAsync" action link, the callout starts an asynchronous operation on your server. The technology disclosed sets status to "PendingStatus" unless the call returned an error status code, in which case it sets status to "FailedStatus". When the server has finished the asynchronous processing it should call back and PATCH the action link to "SuccessfulStatus" or "FailedStatus".

To download a file or visit a UI, direct the user from the link in the "actionUrl" value of the Platform Action response body. In this example, the application must decide when to make a PATCH request to set status to "SuccessfulStatus" or "FailedStatus".

However, you cannot PATCH the status of an action link:
back to NewStatus from a different status.
from a terminal status (FailedStatus or SuccessfulStatus) to NewStatus or PendingStatus.
when the action link belongs to an action link group whose executionsAllowed property is Unlimited.
for an Api or ApiAsync action link whose executionsAllowed property is Once, when a user PATCHes the status to PendingStatus for the first time, the callout is made to the action link. If the same user PATCHes it to PendingStatus again, the technology disclosed returns the current action link information. However, if another user PATCHes the status to PendingStatus, the technology disclosed will throws=an error. In both cases, the callout to the action link is not resent.

If a file download is indicated in the action link, the user is directed to download or visit the UI from the link in the actionUrl of the Platform Action response body. The application can decide when to make a PATCH request to set the second status value to "SuccessfulStatus" or "FailedStatus". For a download, when a user clicks on an action link, the second status value does not change Information about a specific action-link-group may be obtained by querying this resource: GET/connect/action-link-groups/actionLinkGroupId. Because information in the action-link-group definition can be sensitive to a third party (for example, OAuth token headers), only requests made via the connected application that created the action-link-group definition can read or modify the information.

The same keys and values illustrated in Tables I, II, and III (and all subsequent tables) can be included in this type of command string. In this example, the key-value pairs are "Post"ed to a web page, and an OAuth Authorization key-value pair is included.

Figure 4:
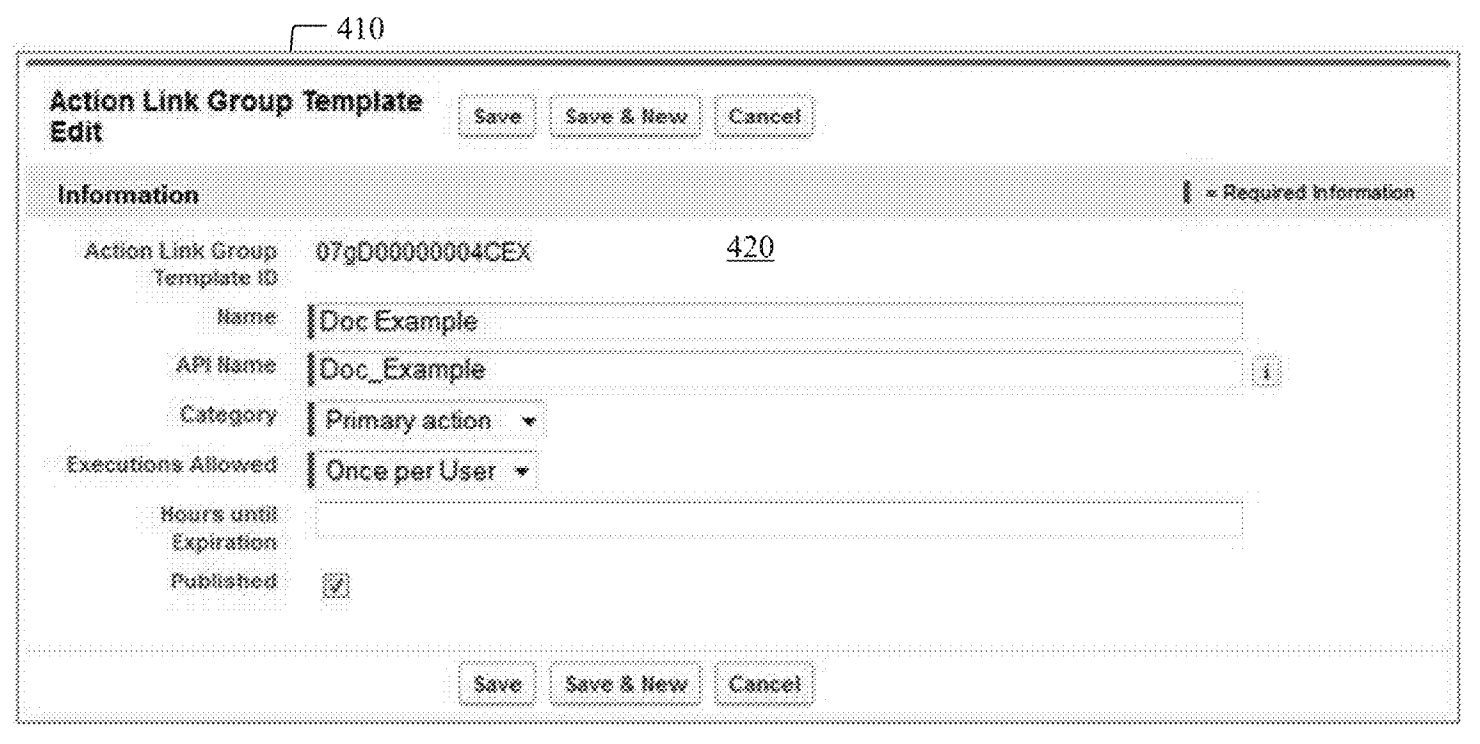
Figure 5:
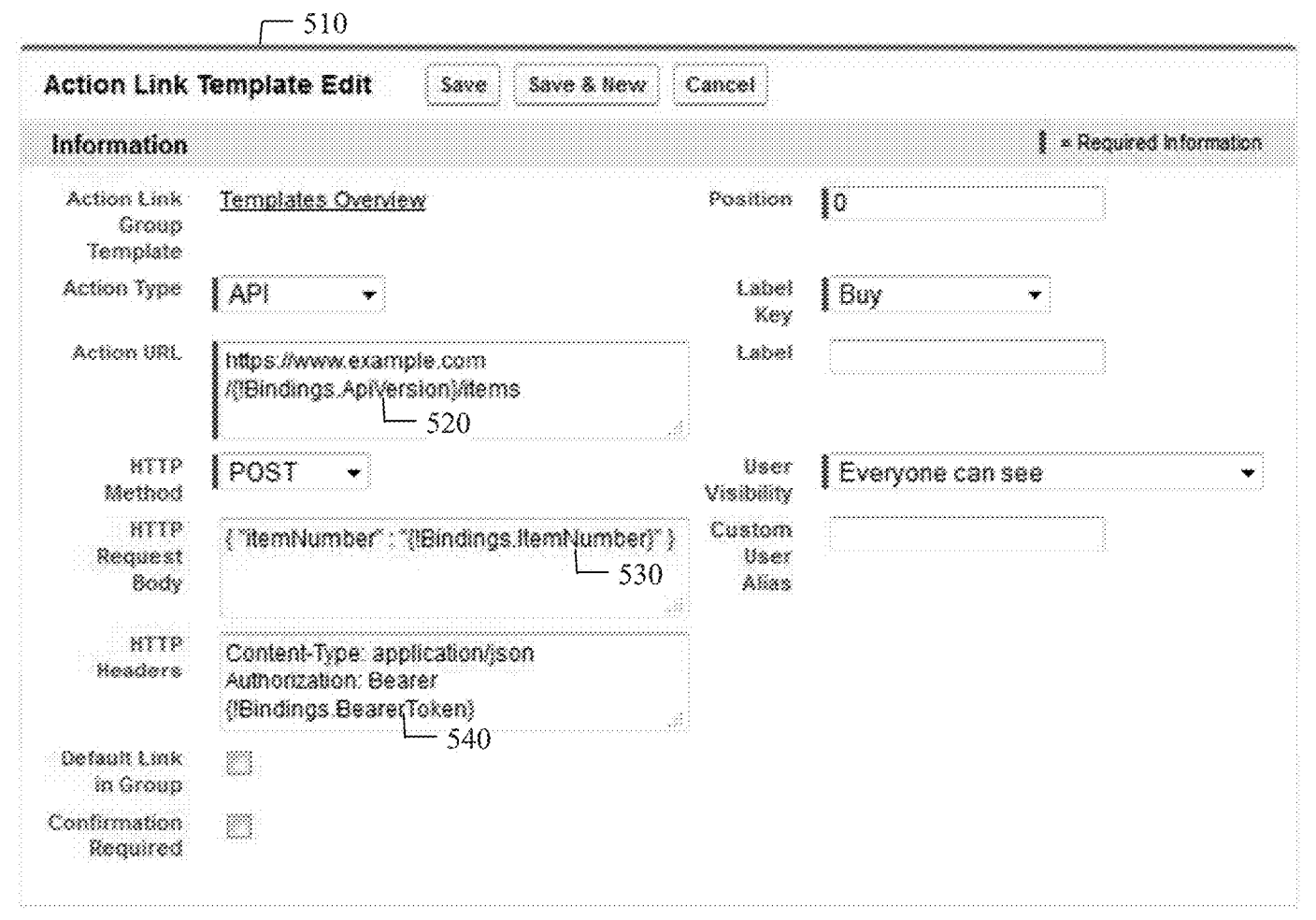

In another implementation, a link group definition can be created declaratively based on a template. The template will provide much of the metadata of the action-link-group definition. An API call or Apex call is still needed to register (i.e. create/instantiate) an ALG Definition. FIG. 4 illustrates a template for an action-link-group 410. The header information 420, such as the header information exemplified in Table 1, can be stored and reapplied to subsequent action-link-groups. The associated active links can also be created, edited, and stored as templates 510 as illustrated in FIG. 5.

TABLE IV

REST API to instantiate the action-link-group
variables based on Action Link Templates POST /connect/action-link-group-definitions
{
"templateId":"07gD00000004C9r",
"templateBindings":[
{
"key":"ApiVersion",
"value":"v1.0"
},
{
"key":"ItemNumber",
"value":"8675309"
},
{
"key":"BearerToken",
"value":"00DRR0000000N0g!ARoAQMZyQtsP1Gs27EZ8hl7vdpYXH5O5rv1VNprq
TeD12xYnvygD3JgPnNR"
}
]
}

This allows the REST API request to instantiate the action links within the action-link-group and set the values of the binding variables, which in this example are the ApiVersion 520, ItemNumber 530, and BearerToken 540, and is illustrated in Table IV above. As well, the technology disclosed includes context variables to pass information about the user who executed the action link and the context in which it was invoked into the HTTP request made by invoking an action link. You can use context variables in the "actionUrl", "headers", and "requestBody" properties of the Action Link Definition Input request body, if they are created via a REST API call such as a connected application through a tool such as curl, or ConnectApi.ActionLinkDefinitionInput object, if using Salesforce Apex. You can also use context variables in the Action URL, HTTP Request Body, and HTTP Headers fields of action link templates. You can edit these fields, including adding and removing context variables, after a template is published.

Polymorphic Groups

As noted above, an action-link-group can be associated with feed items, private messages, notifications, records, etc. Further, the same action-link-group can be associated with multiple items, e.g., more than one feed item, or a feed item and mobile notification, or a feed item and a record, etc. And, the action-link-group can be directed to a plurality of different devices with varying display characteristics, wherein the device manages the display difference by applying a device-specific approach such as a css file.

The execution status is stored for each user for each action-link-group that is active. If a user selects an action link in one feed item and the action item is performed, then the execution state is preserved and reflected in all other places that the action-link-group is referenced. This behavior prevents multiple executions of the same action-link-group where the number of executions is limited.

Custom Label Keys

The action link definition can include a "labelKey" parameter. The UI uses the set of labels identified by the "labelKey" parameter to render the action link. Developers can create custom labels via action link templates to further customize action links. Once the user has taken the action, and that action is successful, the UI will display the past tense of the labelKey, e.g., "Approve" is changed to "Approved." If the action fails, the labelKey is changed to "Approval Failed". If the action link is still pending, the labelKey is changed to "Approval Pending". To create an action-link-group definition, a developer uses a connected app to post a request to the Action-link-group collection resource. Once a developer has created a package in their developer edition, and has published it in the application exchange, an organization administrator can use the connected application framework to install these managed packages in customer organizations. Action links can be created that reference these managed packages label keys in the action-link-group definition, as in Table V below:

TABLE V

Managed package of a collection of custom label keys

{
"actionLinks": [
{
"actionType": "Api",
"labelKey":
"ManagedPackageName.customLabelKey",
"groupDefault": "true",
"actionUrl": "https://test.com/this",
"method": "POST",
"requiresConfirmation": "false"
},
{
"actionType": "Api",
"labelKey": "Unlike",
"groupDefault": "false",
"actionUrl": "https://test.com/that",
"method": "HttpPost",
"requiresConfirmation": "false"
}
],
"executionsAllowed": "OncePerUser",
"expirationDate": "2015-11-07X23:59:11.168Z",
"category": "Primary"
}

Mutual Exclusivity

An action-link-group can contain one or more action links. When an action-link-group contains more than one action link, the action links can be mutually exclusive, i.e., after a user performs one action link, they cannot perform another action link from the same action-link-group. One example of a POST to the /connect/action-link-group-definitions resource is shown in Table VI below.

TABLE VI

Action links that are mutually exclusive

```
{
"actionLinks": [
{
"actionType": "Api",
"labelKey": "Approve",
"groupDefault": "true",
"actionUrl": "https://test.com/this",
"method": "HttpPost",
"requiresConfirmation": "false"
},
{
"actionType": "Api",
"labelKey": "Reject",
"groupDefault": "false",
"actionUrl": "https://test.com/that",
"method": "HttpPost",
"requiresConfirmation": "false"
}
],
"executionsAllowed": "OncePerUser",
"expirationDate": "2015-11-07T23:59:11.168Z",
"category": "Primary"
}
```

In this example, a user can perform only one of the two action links. If the user performs the "Approve" action, they cannot also perform the "Reject" action. Once the user has taken the action, a past tense form of the label is posted in the feed.

Persistent Selection

In another implementation, a persistent selection can be implemented as illustrated in Table VII. In this example, a first action link in an ALG has a labelKey value of "Agree". A second action link in the ALG has a labelKey value of "Disagree". The selection of either the first action link or the second action link is persistent. The user can return to the ALG and change their selection an unlimited number of times.

TABLE VII

Action links with persistent selection

```
{
"actionLinks": [
{
"actionType": "Api",
"labelKey": "Agree",
"groupDefault": "true",
"actionUrl": "https://test.com/agree",
"method": "HttpPost",
"requiresConfirmation": "false"
},
{
"actionType": "Api",
"labelKey": "Disagree",
"groupDefault": "false",
"actionUrl": "https://test.com/disagree",
"method": "HttpPost",
"requiresConfirmation": "false"
}
],
"executionsAllowed": "Unlimited",
"expirationDate": "2015-11-07T23:59:11.168Z",
"category": "Primary"
}
```

Group Repeatability

The action-link-group definition can also be configured with an "executionsAllowed" property, which defines the number of times an action link can be executed. Example values are "Once," where an action link can be executed only once across all users; "OncePerUser," where an action link can be executed only once for each user; and "Unlimited," where an action link can be executed an unlimited number of times by each user. One example of an action-link-group definition illustrating group repeatability is shown in Table VIII below.

TABLE VIII

Illustration of Group Repeatability

```
{
"actionLinks": [
{
"actionType": "Api",
"labelKey": "Like",
"groupDefault": "true",
"actionUrl": "https://test.com/this",
"method": "HttpPost",
"requiresConfirmation": "false"
},
{
"actionType": "Api",
"labelKey": "Unlike",
"groupDefault": "false",
"actionUrl": "https://test.com/that",
"method": "HttpPost",
"requiresConfirmation": "false"
}
],
"executionsAllowed": "OncePerUser",
"expirationDate": "2015-11-07T23:59:11.168Z",
"category": "Primary"
}
```

Group Access and User Targeting

Each individual action link can specify optional parameters that indicate whether the action can be performed by a particular user or set of users, or whether a particular user or a set of users is excluded from performing the action. One example of an action-link-group definition to implement access and targeting rules is illustrated in Table IX below.

TABLE IX

Group access and user targeting

```
{
"actionLinks": [
{
"actionType": "Api",
"labelKey": "Approve",
"groupDefault": "true",
"actionUrl": "https://test.com/this",
"method": "HttpPost",
"userId" : "005B0000000hAGZ",
"requiresConfirmation": "false"
},
{
"actionType": "Api",
"labelKey": "Reject",
"groupDefault": "false",
"actionUrl": "https://test.com/that",
"method": "HttpPost",
"excludedUserId" : "005B0000000hZGZ",
"requiresConfirmation": "false"
}
],
"executionsAllowed": "OncePerUser",
"expirationDate": "2015-11-07T23:59:11.168Z",
"category": "Primary"
}
```

In this example, the action-link-group contains two action links. The first action link has the "userId" parameter specified, which means that only the identified user can view and execute the first action link. The second action link has the optional "excludedUserId" parameter specified, which means that the identified user cannot view or execute the action link.

While the example specifies only one included or excluded user identification, this feature can be enhanced to take on a list of target included or excluded users. Alternatively, the feature can be enhanced to take a profile identity instead, where all users having that profile are permitted to perform the action, and all users belonging to an excluded profile will not be permitted to perform the action.

In one implementation, a first manager can have employees working in her department. She can also have a peer who is a second manager. In one example, a feed can be posted to managers showing a button that allows promotion of a particular employee of the first manager, where all of the managers can see the promotion button in the feed, but only the first manager can press it. In this example, the "userId" key would have the ID of the first manager only. In another example, the particular employee of the first manager can also see the feed. If the "excludedUserId" has the ID of the particular employee, then the particular employee will not see the promotion button.

Figure 6:
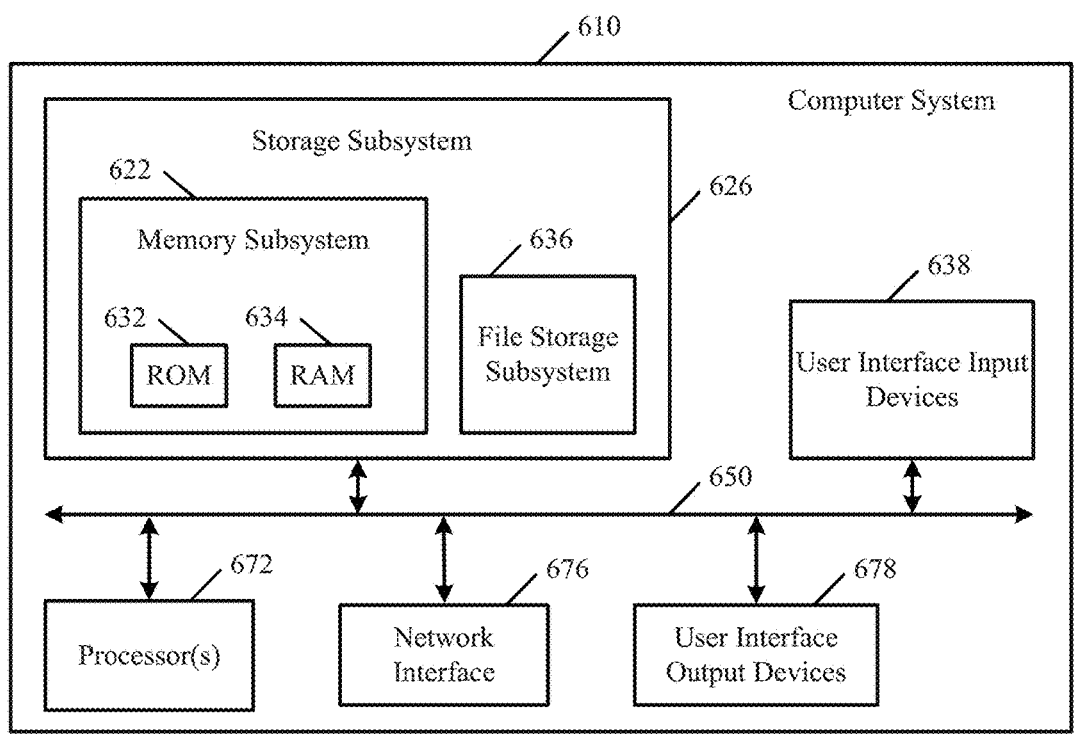
FIG. 6 is a block diagram for an example computer system.

FIG. 6 is a block diagram of an example computer system, according to one implementation. The processor can be an ASIC or RISC processor. It can be an FPGA or other logic or gate array. It can include graphic processing unit (GPU) resources. Computer system 610 typically includes at least one processor 672 that communicates with a number of peripheral devices via bus subsystem 650. These peripheral devices can include a storage subsystem 626 including, for example, memory devices and a file storage subsystem, customer interface input devices 638, customer interface output devices 678, and a network interface subsystem 676. The input and output devices allow customer interaction with computer system 610. Network interface subsystem 676 provides an interface to outside networks, including an interface to corresponding interface devices in other computer systems.

User interface input devices 638 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 610.

User interface output devices 678 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 610 to the user or to another machine or computer system.

Storage subsystem 626 stores programming and data constructs that provide the functionality of some or all of the modules and methods described herein. These software modules are generally executed by processor 672 alone or in combination with other processors.

Memory 622 used in the storage subsystem can include a number of memories including a main random access memory (RAM) 634 for storage of instructions and data during program execution and a read only memory (ROM) 632 in which fixed instructions are stored. A file storage subsystem 636 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 636 in the storage subsystem 626, or in other machines accessible by the processor.

Bus subsystem 650 provides a mechanism for letting the various components and subsystems of computer system 610 communicate with each other as intended. Although bus subsystem 650 is shown schematically as a single bus, alternative implementations of the bus subsystem can use multiple busses. Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as one example. Many other configurations of computer system 610 are possible having more or fewer components than the computer system depicted in FIG. 6.

The examples described above should not be taken as limiting or preferred. These examples sufficiently illustrate the technology disclosed without being overly complicated, and are not intended to illustrate all embodiments of the technology disclosed. A person having ordinary skill in the art will appreciate that there are many potential applications for one or more implementations of this disclosure.

One of ordinary skill in the art can appreciate that a computer or other client device can be deployed as part of a computer network. In this regard, the technology disclosed pertains to any computer system having any number of memory or storage units, and any number of applications and processes occurring across any number of storage units or volumes. The technology disclosed can apply to an environment with server computers and client computers deployed in a network environment, having remote or local storage. The technology disclosed can also apply to a standalone computing device, having programming language functionality, interpretation and execution capabilities.

The technology disclosed can be implemented in the context of any computer-implemented system including a database system, a multi-tenant environment, or the like. Moreover, this technology can be implemented using two or more separate and distinct computer-implemented systems that cooperate and communicate with one another. The disclosed technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the technology disclosed and the scope of the following claims. In some implementations, data stores can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

Particular Implementations

In one implementation, a method of delivering customized action options that integrate a feed system with a non-feed system can include activating an action-link-group, the action-link-group including an API-URL, a plurality of action links, an executions-allowed parameter and one or more group-display parameters, wherein each action link is stored with a label for the action link, an action-link-URL referencing an API entry, and authorization data to be passed with invocation of the action link. The method can include receiving an invocation of the action-link-group and responding by returning data from the plurality of action links, receiving an invocation by a user authenticated with a host-user ID of a selected action-link from the plurality of action links, and responding by invoking the corresponding action-link-URL with the authorization data. The method can also include receiving third-party data generated responsive to invoking the action-link-URL; and causing display of at least some of the received third-party data.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations in other sections.

The method further includes being responsive to the invocation of the action-link-group, and binding data for display with the plurality of action links. Data for display can be chosen from a group including a feed item, a message, a notification, and a database record. The action-link-group further includes an initial action-state status and an HTML method type to combine with the API-URL when invoking a third-party API.

Also included in the method are the storage of authorization data for the action link as an OAuth token, and the storage of the authorization data for a particular action link as a cryptographic token corresponding to a particular user ID for the particular action link. The method includes the storage of at least one action link further stored with an HTTP method type to combine with the action-link-URL and a mandated-confirmation parameter and a corresponding confirmation-eliciting message.

The method further includes at least one action link that is further stored with user targeting data that specifies at least one particular user ID or user group to include or exclude from seeing the action link. It also includes sending the third-party data as key-value pairs to be formatted locally at a display device, and sending the third-party data as parameters to be formatted locally at a display device.

In one example, the executions-allowed parameter specifies whether the action links are mutually exclusive. In another example, the executions-allowed parameter specifies whether the action links can be repeatedly executed. The group-display parameters specify at least whether the action links are to be displayed with an item or responsive to selecting an options menu.

Other implementations can include a computing system comprising a processor and memory, wherein the memory comprises computer-executable instructions that, when executed by the processor, deliver customized action options that integrate a feed system with a non-feed system causing the computing system to activate an action-link-group, the action-link-group including an API-URL, a plurality of action links, an executions-allowed parameter and one or more group-display parameters, wherein each action link is stored with a label for the action link, an action-link-URL referencing to an API entry, and authorization data to be passed with invocation of the action link. The system can also receive an invocation of the action-link-group and responding by returning data from the plurality of action links, receive an invocation by a user authenticated with a host-user ID of a selected action-link from the plurality of action links, and responding by invoking the corresponding action-link-URL with the authorization data. In addition, the system can receive third-party data generated responsive to invoking the action-link-URL; and cause display of at least some of the received third-party data.

This system and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations in other sections.

The system is also responsive to the invocation of the action-link-group, binding data for display with the plurality of action links.

A non-transitory computer readable medium holding computer program instructions that, when executed, include activating an action-link-group, the action-link-group including an API-URL, a plurality of action links, an executions-allowed parameter and one or more group-display parameters, wherein each action link is stored with a label for the action link, an action-link-URL referencing to an API entry, and authorization data to be passed with invocation of the action link. The non-transitory computer readable medium also includes receiving an invocation of the action-link-group and responding by returning data from the plurality of action links, receiving an invocation by a user authenticated with a host-user ID of a selected action-link from the plurality of action links and responding by invoking the corresponding action-link-URL with the authorization data, receiving third-party data generated responsive to invoking the action-link-URL; and causing display of at least some of the received third-party data.

This non-transitory computer readable medium and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations in other sections.

The non-transitory computer readable medium further includes being responsive to the invocation of the action-link-group, and binding data for display with the plurality of action links.

What is claimed is:

1. A method of delivering customized action options that integrate a feed system with a non-feed system, the method including:
    storing an action-link-group, the action-link-group including a plurality of action links, an executions-allowed parameter, and a category parameter indicating a display attribute of the plurality of action links within the feed system, wherein an action link of the plurality of action links is stored with information including:
        a label for the action link,
        an action-link-URL referencing an API entry of the non-feed system,
        an action type indicating a type of action to be taken with respect to the action-link-URL in response to invoking the action link, and
        authorization data to be passed during invocation of the action link;
    integrating the action-link group as a feed item of the feed system based on the category parameter, wherein an execution status of the action link is maintained with the feed item for comparison with the executions-allowed parameter;
    receiving an invocation request, from a user authenticated with a host-user ID, the invocation request including the action link of the plurality of action links;
    invoking the action-link-URL with the authorization data;
    receiving third-party data from the non-feed system generated responsive to invoking the action-link-URL; and
    causing display of the third-party data from the non-feed system as a feed item of the feed system.

2. The method of claim 1, further including, binding data for display with the plurality of action links.

3. The method of claim 2, further including causing display of the third-party data as a message.

4. The method of claim 2, further including causing display of the third-party data as a notification.

5. The method of claim 2, further including causing display of the third-party data as a database record.

6. The method of claim 1, wherein the action-link-group further includes an initial action-state status and an HTTP method type to combine with the action type when invoking a third-party API.

7. The method of claim 1, further including storing the authorization data for the action link as an OAuth token.

8. The method of claim 1, further including storing the authorization data for the action link as a cryptographic token corresponding to a particular user ID for the action link.

9. The method of claim 1, wherein the action link is further stored with an HTTP method type to combine with the action type and a mandated-confirmation parameter and a corresponding confirmation-eliciting message.

10. The method of claim 1, wherein the action link is a first action link, and at least a second action link is stored with user targeting data that specifies at least one particular user ID or user group to include or exclude from viewing the second action link.

11. The method of claim 1, further including sending the third-party data as key-value pairs to be formatted locally at a display device.

12. The method of claim 1, further including sending the third-party data as parameters to be formatted locally at a display device.

13. The method of claim 1, wherein the executions-allowed parameter specifies whether the action links are mutually exclusive.

14. The method of claim 1, wherein the executions-allowed parameter specifies whether the action links can be repeatedly executed.

15. The method of claim 1, wherein the category parameter indicates whether the plurality of action links are to be displayed with an item or responsive to selecting an options menu.

16. A computing system comprising a processor and memory, wherein the memory comprises computer-executable instructions that, when executed by the processor, deliver customized action options that integrate a feed system with a non-feed system causing the computing system to:
    store an action-link-group, the action-link-group including a plurality of action links, an executions-allowed parameter, and a category parameter indicating a display attribute of the plurality of action links within the feed system, wherein an action link of the plurality of action links is stored with information including:
        a label for the action link,
        an action-link-URL referencing an API entry of the non-feed system,
        an action type indicating a type of action to be taken with respect to the action-link-URL in response to invoking the action link, and
        authorization data to be passed during invocation of the action link;
    integrate the action-link group as a feed item of the feed system based on the category parameter, wherein an execution status of the action link is maintained with the feed item for comparison with the executions-allowed parameter;
    receive an invocation request, from a user authenticated with a host-user ID, the invocation request including the action link of the plurality of action links;
    invoking the action-link-URL with the authorization data;
    receive third-party data from the non-feed system generated responsive to invoking the action-link-URL; and
    cause display of the third-party data from the non-feed system as a feed item of the feed system.

17. The system of claim 16, further including, bind data for display with the plurality of action links.

18. A non-transitory computer readable medium holding computer program instructions that, when executed by a processor, deliver customized action options that integrate a feed system with a non-feed system causing a computing system to:
    store an action-link-group, the action-link-group including a plurality of action links, an executions-allowed parameter, and a category parameter indicating a display attribute of the plurality of action links within the feed system, wherein an action link of the plurality of action links is stored with information including:
        a label for the action link,
        an action-link-URL referencing an API entry of the non-feed system, an action type indicating a type of action to be taken with respect to the action-link-URL in response to invoking the action link, and
authorization data to be passed during invocation of the action link;
integrate the action-link group as a feed item of the feed system based on the one category parameter, wherein an execution status of the action link is maintained with the feed item for comparison with the executions-allowed parameter;
receive an invocation request, from a user authenticated with a host-user ID, the invocation request including the action link of the plurality of action links;
invoking the action-link-URL with the authorization data;
receive third-party data from the non-feed system generated responsive to invoking the action-link-URL; and
cause display of the third-party data from the non-feed system as a feed item of the feed system.

19. The non-transitory computer readable medium of claim 18, further including:
bind data for display with the plurality of action links.

20. A method of simplified incorporation of a third-party non-feed application into a host feed application, the method including:
storing an action-link-group, the action-link-group including a plurality of action links, an executions-allowed parameter, and a category parameter indicating a display attribute of the plurality of action links within the feed system, wherein an action link of the plurality of action links is stored with information including:
a label for the action link,
an action-link-URL referencing an API entry of the non-feed system,
an action type indicating a type of action to be taken with respect to the action-link-URL in response to invoking the action link, and
authorization data to be passed during invocation of the action link;
integrating the action-link group as a feed item of the feed system based on the category parameter, wherein an execution status of the action link is maintained with the feed item for comparison with the executions-allowed parameter;
receiving an invocation request, from a user authenticated with a host-user ID, the invocation request including the action link of the plurality of action links;
invoking the action-link-URL with the authorization data;
receiving third-party data from the non-feed system generated responsive to invoking the action-link-URL; and
causing display of the third-party data from the non-feed system as a feed item of the feed system.

21. The method of claim 20, wherein the executions-allowed parameter specifies whether the action links are mutually exclusive.

* * * * *